United States Patent [19]
Kasiraj et al.

[11] Patent Number: 5,777,815
[45] Date of Patent: Jul. 7, 1998

[54] DISK DRIVE WITH SHOCK DETECTION BASED ON THERMORESISTIVE SIGNAL FROM MAGNETORESISTIVE HEAD

[75] Inventors: Prakash Kasiraj; Steven Wayne Meeks, both of San Jose; Timothy Clark Reiley, Los Gatos, all of Calif.

[73] Assignee: International Business Machines Corporation, Armonk, N.Y.

[21] Appl. No.: 664,960

[22] Filed: Jun. 13, 1996

[51] Int. Cl.$^6$ .................................................. G11B 21/02
[52] U.S. Cl. .............................. 360/75; 360/113; 360/69
[58] Field of Search ........................... 360/75, 60, 121, 360/113, 69, 77.06, 122, 123, 126, 66, 67

[56] References Cited

U.S. PATENT DOCUMENTS

| | | | |
|---|---|---|---|
| 4,862,298 | 8/1989 | Genheimer et al. | 360/60 |
| 5,057,678 | 10/1991 | Ichikawa | 360/121 |
| 5,227,929 | 7/1993 | Comerford | 360/75 |
| 5,299,075 | 3/1994 | Hanks | 360/77.02 |
| 5,333,138 | 7/1994 | Richards et al. | 371/7 |
| 5,455,730 | 10/1995 | Dovek et al. | 360/113 |
| 5,521,772 | 5/1996 | Lee et al. | 360/75 |
| 5,527,110 | 6/1996 | Abraham et al. | 374/5 |
| 5,640,089 | 6/1997 | Horikawa et al. | 360/113 |

FOREIGN PATENT DOCUMENTS

7-006487  1/1995  Japan.

Primary Examiner—Nabil Hindi
Attorney, Agent, or Firm—Thomas R. Berthold

[57] ABSTRACT

A magnetic recording disk drive with a magnetoresistive (MR) read sensor or head has a shock and vibration detection circuitry responsive to a thermoresistive signal contained in the signal from the head. The MR head is heated by an electrical bias current and is supported on the head carrier near the surface of the disk. External shock or vibration to the disk drive alters the spacing between the carrier and the disk, which causes fluctuations in the head temperature due to cooling of the heated head by the disk. These temperature fluctuations are reflected in the signal from the head as a thermoresistive signal comprising modulation of a baseline voltage level. The shock detection circuitry compares positive and negative excursions of this thermoresistive signal with a predetermined threshold voltage level. When the threshold is exceeded, indicating an external shock or vibration in excess of an allowable limit, writing of data is inhibited.

11 Claims, 6 Drawing Sheets

DISK DRIVE WITH SHOCK DETECTION BASED ON THERMORESISTIVE SIGNAL FROM MAGNETORESISTIVE HEAD

TECHNICAL FIELD

This invention relates in general to magnetic recording disk drives that use magnetoresistive (MR) read sensors or heads for reading data, and more particularly to such disk drives that use shock or vibration sensing to modify certain drive operations, such as inhibiting the reading or writing of data.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read and write operations. The most common form of actuator is a rotary voice coil motor (VCM) actuator that moves the head carrier in a nonlinear, generally arcuate path across the disk. There are typically a number of disks mounted on a hub that is rotated by a disk drive motor, and a number of head carriers connected to the actuator for accessing the surfaces of the disks. A housing supports the drive motor and head actuator and surrounds the heads and disks to provide a substantially sealed environment. In conventional magnetic recording disk drives, the head carrier is an air-bearing slider that rides on a bearing of air above the disk surface when the disk is rotating at its operational speed. The slider is maintained near the disk surface by a biasing force from a suspension that connects the slider to the actuator. Contact and near-contact or "proximity" disk drives have been proposed where the head carrier may be only partially supported by an air-bearing and may be in constant or occasional contact with the disk or a lubricant film on the disk during read and write operations. Examples of these types of disk drives are described in IBM's U.S. Pat. Nos. 5,200,867; 5,097,368 assigned to Conner Peripherals; and U.S. Pat. No. 5,041,932 assigned to Censtor Corporation.

The most common type of disk drive head for reading and writing data is a dual function inductive read/write head. Recently, magnetoresistive (MR) disk drives are available that use MR read sensors or heads in combination with inductive write-only heads. MR heads generate a read signal as a result of a change in electrical resistance caused by the magnetic fields recorded on the disk. By way of example, IBM's U.S. Pat. No. 3,908,194 describes a "piggyback" thin film head that combines an MR read head with an inductive write head. The first commercial air-bearing rigid disk drive with an MR read head and an inductive write head was introduced by IBM in 1991.

It has been discovered that due to the extremely close head-disk spacing in low-flying or near-contact MR disk drives, the waviness of the disk substrate and variations in the slider flying height induce a modulation on the baseline signal of the MR head readback data signal. The sensing element in the MR head is required to be biased by an electrical sense or bias current in order to be able to detect magnetic fields as changes in resistance. This bias current heats the head above ambient temperature. The baseline modulation of the MR signal is thus due to cooling of the temperature-elevated MR element by the disk, with the temperature variation being directly related to the variation in head-disk spacing. IBM's U.S. Pat. No. 5,455,730 describes an MR disk drive that includes several means for minimizing the effect of this baseline modulation on the MR readback data signal.

Disk drives, especially those used in portable or laptop computers, are sensitive to external shock and vibration that can cause the heads to move to the wrong track during a track accessing or "seek" operation or to move off track during a read or write operation. The writing of data on the wrong track is unacceptable because it usually results in the loss of data on the track that is written over. As disk drives become smaller and their track density (i.e., number of data tracks per radial inch) increases, the effect of external shock and vibration becomes more pronounced. Various techniques have been proposed to address this problem by sensing the external force and either compensating for it or shutting down some operation of the disk drive until the force is removed. These techniques typically involve the use of separate electromechanical shock sensing devices, such as conventional accelerometers, that are mounted to the disk drive housing or to the printed circuit board that contains the disk drive electronics. For example, U.S. Pat. No. 5,299,075 assigned to Hewlett-Packard, describes a disk drive that uses a rotary accelerometer output as feedback into the actuator tracking control or servo system to compensate for shock or vibration-induced tracking errors. IBM's U.S. Pat. No. 5,227,929 describes a laptop computer with a three-axis accelerometer whose output is used to move the heads to a parking zone and stop rotation of the disk drive motor. U.S. Pat. No. 4,862,298 assigned to Magnetic Peripherals, and U.S. Pat. No. 5,333,138 assigned to MiniStor Peripherals, describe disk drives with electromechanical shock sensors for inhibiting writing of data in the presence of excessive external shock forces.

There are several disadvantages with the use of shock sensors in disk drives. The cost of the sensor and its associated electronics is several dollars. If the sensor and its electronics are mounted on the printed circuit board then additional board real estate must be made available. Most shock sensors are vibrating beam piezoelectric ceramic devices that are mounted on the drive's printed circuit board located on the back side of the disk drive housing. The limitation of this mounting arrangement is that a shock or vibration to the disk drive will affect the sensor differently than the head carrier of interest, i.e., the carrier supporting the head that is doing the writing at the time of the shock. Since the response of the writing head to a shock is dominated by the vibration modes of the head suspension and disk, while the response of the shock sensor is dominated by the vibration modes of the disk drive base, there is a likelihood that shocks that would produce soft or hard data errors if writing occurred during the shock can go undetected by the sensor. An additional limitation of these conventional shock sensors is that because of the limited resonant frequency of the vibrating beam, approximately 30 kHz, they can accurately measure shocks only up to frequencies well below this resonant frequency, i.e., only up to about 5 kHz.

What is needed is a disk drive with a shock sensing capability that does not have any of the disadvantages of disk drives that use conventional shock sensors.

SUMMARY OF THE INVENTION

The invention is a magnetic recording disk drive with a magnetoresistive (MR) read head that uses a thermoresistive effect in the MR head signal to detect external shocks and inhibit writing. The MR head is heated by an electrical bias current and is supported on the head carrier near the surface of the disk. External shock or vibration to the disk drive alters the spacing between the carrier and the disk, which causes fluctuations in the head temperature due to cooling of the heated head by the disk. These temperature fluctuations are reflected in the signal from the MR head as a thermoresistive signal comprising modulation of a baseline voltage level. The disk drive includes shock detection circuitry that compares positive and negative excursions of this thermoresistive signal with a predetermined threshold voltage level. When the threshold is exceeded, indicating an external shock or vibration in excess of an allowable limit, writing of data is inhibited.

For a fuller understanding of the nature and advantages of the present invention, reference should be made to the following detailed description taken together with the accompanying figures.

DESCRIPTION OF THE PREFERRED EMBODIMENTS

Figure 1:
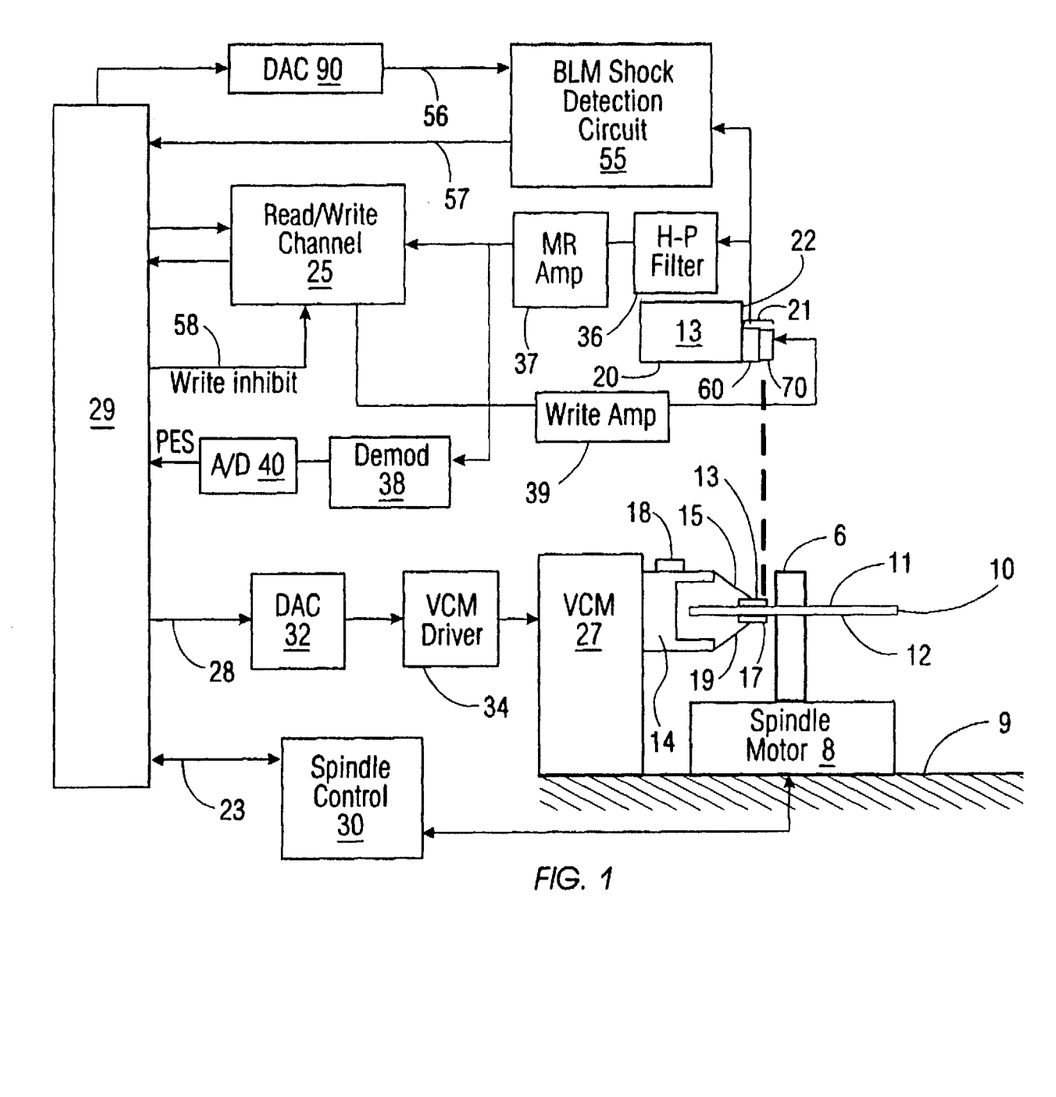
FIG. 1 is a block diagram of a magnetic recording disk drive incorporating the baseline modulation shock detection circuit of the present invention.

A disk drive incorporating the present invention is shown schematically in FIG. 1.

A magnetic recording disk 10, having "top" 11 and "bottom" 12 magnetic recording surfaces, is supported on a spindle 6 and rotated by the drive or spindle motor 8. The magnetic recording media on each disk surface 11, 12 is in the form of an annular pattern of concentric data tracks (not shown).

A head carrier 13 is positioned on the top surface 11 of disk 10. Carrier 13 is an air-bearing slider having an air-bearing surface (or disk side 20) facing toward the disk, and a trailing end 22. The head carrier 13 supports a read/write transducer 21 on its trailing end 22 for reading and writing data to the magnetic media on disk surface 11. The transducer 21 is a dual element head having an inductive write element 70 and an MR read element or sensor 60. The carrier 13 is an air-bearing slider transducer 21 being located on the slider's trailing end 22. Carrier 13 is attached to an actuator arm 14 by means of a suspension 15. The suspension 15 provides a slight spring force that biases the carrier 13 toward the disk surface 11. A second carrier 17, also supporting a read/write transducer, is positioned on the bottom surface 12 of disk 10 and is attached to actuator arm 14 by means of a suspension 19.

Actuator arm 14 is attached to a rotary actuator 27. The actuator is typically a rotary voice coil motor (VCM) that comprises a coil movable within a fixed magnetic field, the direction and velocity of the coil movements being controlled by motor current signals supplied by a controller 29. As the disk 10 rotates, the rotary actuator 27 moves the carriers 13, 17 in a generally arcuate path radially in and out over their respective disk surfaces 11, 12 so that the read/write transducers may access different portions of the disk surfaces where data is desired to be read or recorded. Both the actuator 27 and spindle motor 8 are mounted to a portion of the disk drive housing 9.

The rotation of the disk 10 generates an air bearing between the carrier 13 and its associated disk surface 11. During operation of the disk drive, the air bearing thus counterbalances the slight spring force of the suspension 15 and supports the carrier 13 off and slightly away from the disk surface 11 by a small, substantially constant spacing. The present invention is applicable to air-bearing disk drives that have a head-disk spacing small enough so that modulation of the MR signal baseline occurs, as well as to contact and near-contact recording disk drives where the head carrier is in contact or occasional contact with the disk during read and write operations.

The various components of the disk drive are controlled in operation by control signals generated by microcontroller 29. The controller 29 includes logic control circuits, memory storage, and a microprocessor, for example. The controller 29 generates control signals for various drive operations, such as spindle motor control signals on line 23 and track following and seek control signals on line 28 for actuator 27.

The spindle motor control signals on line 23 are sent to spindle controller 30 that controls the current to the armatures of spindle motor 8 to rotate the motor at a constant rotational speed during drive operation. Spindle controller 30 also provides status signals to microcontroller 29, e.g., a speed signal indicating that spindle motor 8 has achieved operational speed.

Data from disk surface 11 is read by the MR sensor 60. The MR signal is filtered by high-pass filter 36 and amplified by amplifier 37. The filter 36, amplifier 37 and other read signal processing circuitry, as well as the circuitry for generating the sense or bias current to the MR sensor 60, are typically part of an integrated circuit module 18 located on arm 14. This module is placed close to the read/write transducer 21 to keep the interconnections as short as possible, and is thus called the arm electronics (AE) module. The AE module 18 is connected to multiple read/write transducers, e.g., only two in FIG. 1, and thus includes a multiplexer to select which MR sensor signal to send to its processing circuitry that includes filter 36 and amplifier 37. The output from MR amplifier 37 is sent to the read/write data channel 25 where the analog signal from the MR sensor 60 is processed into digital signals representing data recorded on the disk. Channel 25 typically includes circuitry for automatic gain control, analog to digital conversion, and digital data detection. Data is written to the disk surface 11 by write signals sent through read/write data channel 25 and write amplifier 39 to inductive write head 70. Write amplifier 39 is typically located in AE module 18.

The track following and seek control signals on line 28 are generated by microcontroller 29 that runs a servo control algorithm in response to input head position error signals (PES). The MR sensor 60 reads head position servo information recorded on the disk, typically at equally angularly spaced servo sectors embedded between the data sectors. This analog servo output from MR amplifier 36 is demodulated by demodulator 38 and converted to the digital PES by analog-to-digital (A/D) converter 40. The track following and seek control signals on line 28 are sent to digital-to-analog converter (DAC) 32 that converts them to analog voltage signals which are output to VCM driver 34. VCM driver 34 then sends corresponding current pulses to the coil of VCM actuator 27 to pivot the arm 14 radially inward and outward to optimally move and position the carriers 13, 17 to the desired data track on the respective disk surfaces 11, 12.

The above described components of FIG. 1 and their mode of operation form part of a conventional prior art MR disk drive. The present invention is the incorporation into a conventional MR disk drive of a baseline modulation (BLM) shock detection circuitry 55 and its associated control logic to be described later. However, modulation of the MR signal baseline as a result of variations in the head-disk spacing will first be explained with reference to FIG. 2.

Figure 2:
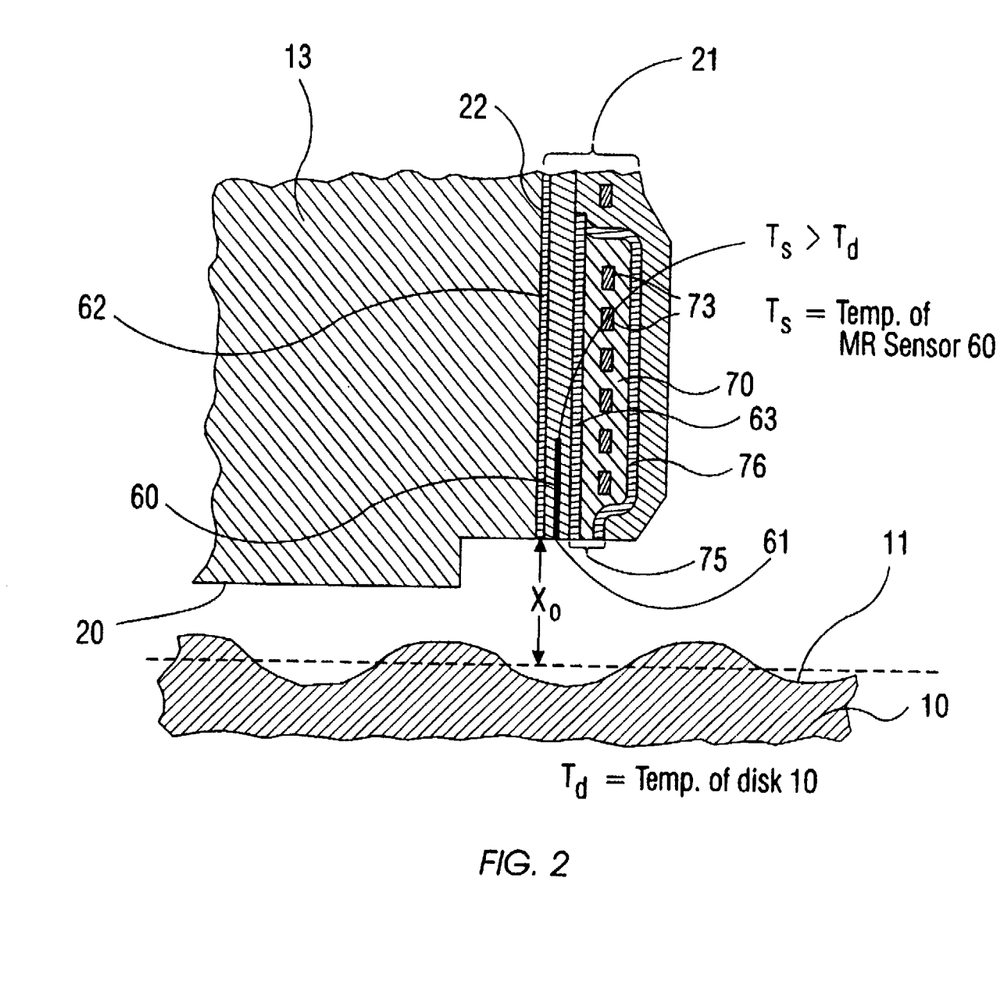
FIG. 2 is an enlarged sectional view of the end of the head carrier and the disk and illustrating the variation in spacing between the MR sensor and the disk.

FIG. 2 illustrates a portion of disk 10 and an enlarged portion of carrier 13 with the MR read/inductive write head 21 formed as a thin film head on the trailing edge 22. Both the MR read sensor 60 and the inductive write head 70 are formed as thin films on the rear or trailing edge 22 of the carrier 13, which serves as the substrate for the deposition of the films. The MR read sensor 60 has an end 61 and is located between spaced-apart shields 62, 63. MR sensor 60 is often referred to as a "stripe" of magnetoresistive material having a thickness (measured in a plane parallel to the disk side 20 of carrier 13) and a height measured in the direction perpendicular to the disk side 20). The inductive write head 70 has a coil 73 (shown in section) and a recording gap 75. The recording gap 75 is defined by two pole tips, one of which is pole tip 76 and the other of which also serves as MR shield 63. Both the end 61 of MR read sensor 60 and the gap 75 of inductive write head 70 are oriented toward the surface 11 of disk 10 for reading and writing data and are recessed from the disk side 20 of carrier 13. The end 61 of MR sensor 60 has a nominal spacing $X_0$ from disk surface 11. However, this spacing varies due to variation of the flying height of the carrier 13 and the inherent waviness and other surface irregularities in the disk surface 11.

As depicted in FIG. 2, the MR sensor 60 is at a nominal temperature $T_s$, which is greater than the temperature $T_d$ of disk 10 because of Joule heating caused by the bias current supplied to MR sensor 60. The temperature $T_s$ is determined by the $I^2R$ power dissipated in the MR sensor 60 (I being the bias current and R the resistance of the MR sensor 60) and by the thermal conductance from the MR sensor 60 to its surroundings. Much of the heat is conducted away from MR sensor 60 internally to the body of carrier 13. However, if the spacing between the MR sensor 60 and disk 10 is small, heat will also be conducted to the disk 10 through the head-disk spacing, i.e., the spacing $X_0$ separating the MR sensor 60 and disk 10. The variation in head-disk spacing modulates the thermal conductance between the MR sensor 60 and disk 10. This in turn modulates the degree of cooling of the MR sensor by the disk and hence the MR sensor temperature. The fluctuations in MR sensor temperature result in corresponding fluctuations in resistance, and this gives rise to modulation of the baseline signal from the MR sensor at constant bias current. Unlike the readback data signal from the MR sensor, which is due to the magnetoresistive effect, this baseline signal modulation is due to a thermoresistive effect. Thus the signal from the MR sensor includes both a magnetoresistive signal and a thermoresistive signal.

In the present invention, the modulation of the MR sensor's baseline signal that occurs due to rapid changes in head-disk spacing in response to an external shock is used as an external shock sensor. As shown in FIG. 1, the DC coupled signal from the MR sensor 60 is fed into a baseline modulation (BLM) detection circuit 55. A shock or vibration to the disk drive will cause the carrier 13 for the read/write head 21 (both write head 70 and MR read sensor 60) to modulate its spacing from the disk 10. This head-disk spacing modulation can be the result of a shock or vibration affecting one or more disk drive components, e.g., suspension 15, disk 10 or spindle shaft 6. The result of the spacing modulation is a change in the temperature of the MR sensor 60 as it approaches and recedes from the disk 10 (FIG. 2). This results in a change in the resistance of the MR sensor 60 and a resulting change in voltage which is detected by the BLM shock detection circuit 55.

The BLM shock detection circuit 55 processes the input signal from MR sensor 60 and provides an output on line 57 when the processed signal exceeds a predetermined threshold value. The sensitivity of the circuit 55 is thus determined by this threshold value. As shown in FIG. 1, the sensitivity of the circuit 55 to a shock is controlled by a threshold control signal from the controller 29. DAC 90 converts this signal to an analog BLM threshold control voltage signal 56 which is fed into the threshold control input of BLM circuit 55. The threshold control signal 56 from DAC 90 controls the magnitude of shock at which the BLM shock detection circuit 55 will respond. The value of the threshold control signal from the controller 29 corresponds to a certain level of acceleration which is calibrated when the disk drive is assembled. When the BLM shock detection circuit 55 detects a shock, it generates a shock signal by changing the state of its output line 57 from low to high. The controller 29 monitors the output line 57 of the BLM shock detection circuit 55 and upon detection of a shock signal sends a write inhibit signal 58 to channel 25 to stop the writing of data on the disk 11 by the write head 70. The result is that the controller 29 causes the read/write channel 25 to inhibit the recording of data through the write head 70 so long as the shock signal on line 57 from BLM detection circuit 55 is high, or for some predetermined period of time. Alternate algorithms in which the write inhibit is maintained active for a predetermined length of time, followed by a query of the state of the shock sensor output such that the write inhibit is either extended or terminated, are envisioned.

A single threshold value can be used for all head carriers. However, differences in shock sensitivity among different head carriers and MR sensors in the disk drive may be accounted for during calibration and a separate threshold control signal value used for each MR sensor. These separate values are stored in memory accessible by controller 29. Depending on which MR sensor the multiplexer in AE module 18 has selected, the appropriate threshold control signal value is sent to detection circuit 55.

In magnetic recording disk drives the primary concern with external shock and vibration is off-track writing, i.e., the shock or vibration can move the write head off track so that data is placed in the wrong position on a data track or on the wrong data track. The present invention can detect shocks in two ways. In the preferred embodiment the shocks are detected by the MR sensor that is on the same carrier that supports the write head that is doing the writing. For example, MR sensor 60 acts as the shock sensor for write head 70. In the operation of conventional MR disk drives with multiple read/write heads and head carriers, when writing is being done by a write head the bias current is kept at the read level for the corresponding MR sensor that is located on the carrier that supports the write head doing the writing. Thus, in this preferred embodiment of the present invention, the MR sensor signal is directly available from the AE module for input to BLM detection circuit 55. An alternative embodiment of the present invention is to detect the shock with an MR sensor that is on a different carrier than the one that supports the write head which is writing. For example, the MR sensor on carrier 17 can function as the shock sensor while write head 70 on carrier 13 is writing. The advantage of this approach is that there will be no crosstalk between the MR sensor attached to carrier 17 and the write head 70 on carrier 13. In this alternative embodiment modification of the multiplexer in the AE module will be required to provide for a second line out so that the signal from the MR sensor being used as the shock sensor can be sent to BLM detection circuit 55.

Figure 3:
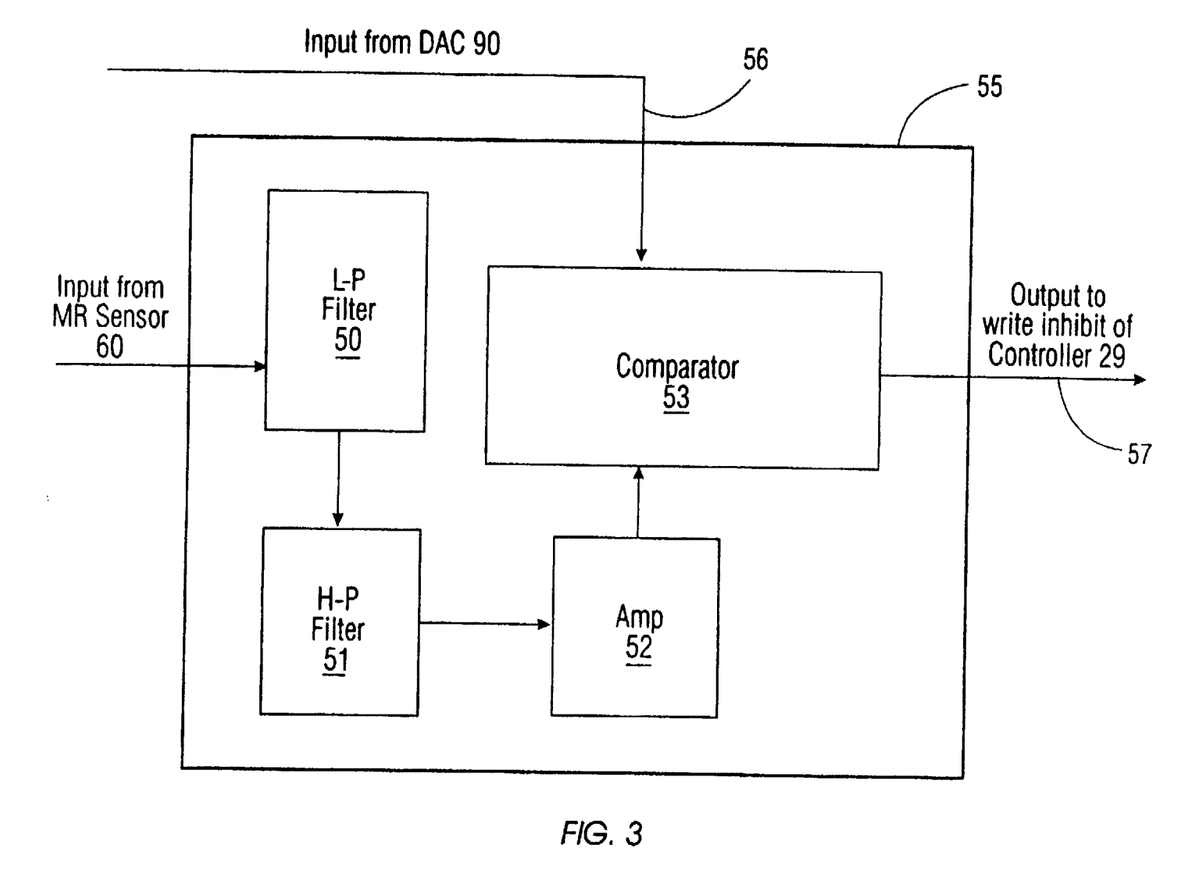
FIG. 3 is a block diagram of the components making up the baseline modulation shock detection circuit.

FIG. 3 shows the components of BLM shock detection circuit 55. The DC coupled input from the MR sensor 60 is first filtered by a low pass filter 50 with a typical cutoff frequency of 10 kHz. This removes the high frequency magnetic data signal (a series of positive and negative analog voltage pulses about the nominal MR sensor baseline voltage level at a frequency of approximately 20 MHZ) and any high frequency components caused by short range variations in the disk topography. The low pass filter 50 also prevents saturation of the amplifier 52 by crosstalk from the write head 70 to the MR sensor 60. The signal is then filtered by a high pass filter 51 with a typical cutoff frequency around 100 Hz. This removes the DC component and any components caused by long range disk surface waviness or motor noise. The output of high pass filter 51 is sent to an amplifier 52. The output of amplifier 52 contains only the modulation of the MR sensor baseline signal that is the response of the MR sensor to external shocks and vibration. The amplified signal from amplifier 52 is sent to comparator 53. The comparator 53 tests the incoming signal to see if both positive and negative excursions of the signal exceed the threshold set from the controller 29. If the threshold is exceeded, then the output of comparator 53 will change state and send a shock signal on line 57 to the write inhibit input of controller 29. When line 57 is high controller 29 will send a signal 58 to inhibit the read/write channel 25 from recording data on the disk surface 11. Once line 57 goes high the signal 58 will inhibit the read/write channel 25 for a predetermined inhibit time, after which the controller 29 will terminate signal 58. This inhibit time is determined experimentally based on the time for the head carrier vibration to cease or return to a level where writing can be safely performed. Once writing has been inhibited, the read/write channel 25 must wait for at least one disk revolution before writing can resume. The comparator 53 is reset by controller 29 or by an internal clock, as is well known in the art. As an additional safety factor, the controller 29 may check to confirm that the shock signal on line 57 is low before terminating signal 58.

FIGS. 1 and 3 show the threshold of comparator 53 being set by controller 29 through DAC 90. However, a predetermined fixed threshold voltage can be supplied directly to comparator 53 from a voltage source, such as the disk drive power supply. This will eliminate the need for DAC 90 and will result in all head carriers having a shock sensitivity determined by this fixed threshold voltage value.

The circuitry shown in FIG. 3 can be contained within the AE module 18 on arm 14 or on the disk drive circuit board that contains the controller 29.

Figure 4:
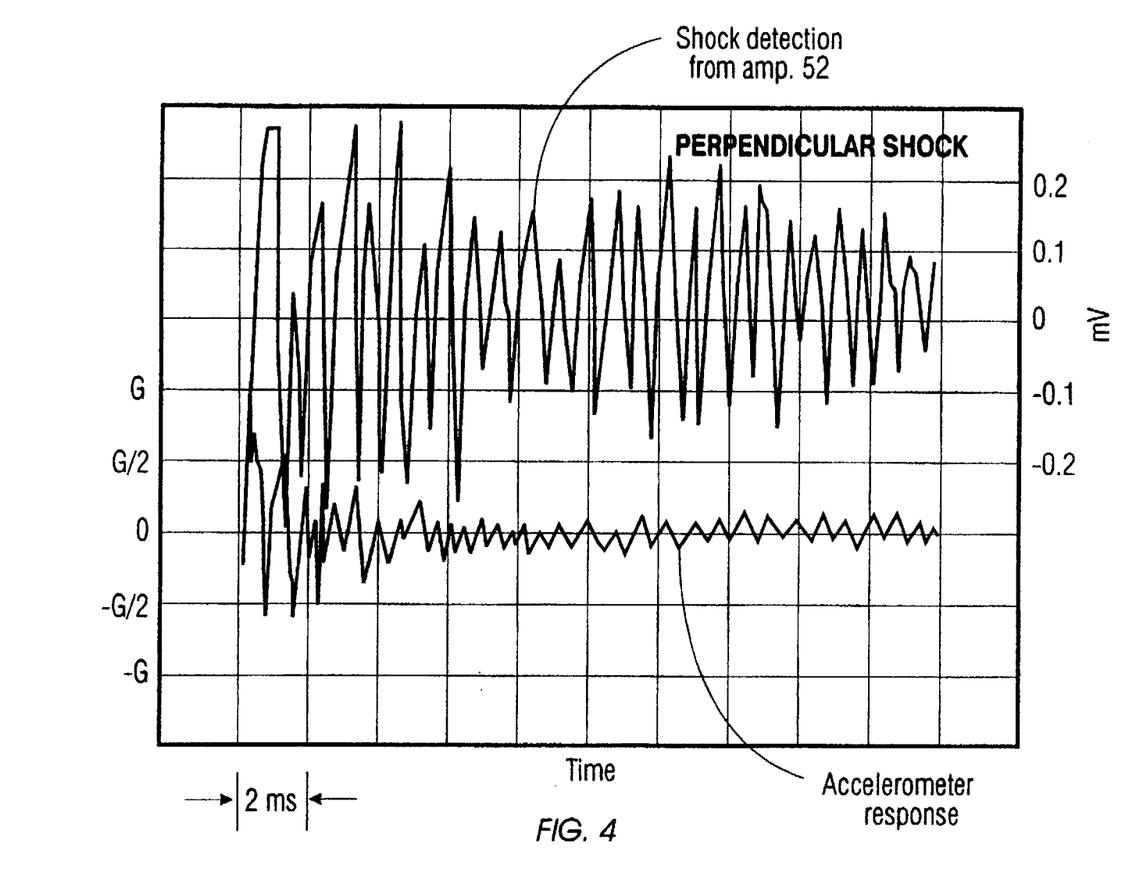
FIG. 4 is a graph of the baseline modulation shock detector response compared to accelerometer response for an external shock applied in a direction perpendicular to the disk.

FIG. 4 shows the response of the baseline MR signal, taken at the output of amplifier 52, to an external shock applied in the direction perpendicular to the plane of disk 10 compared to the corresponding signal of a conventional accelerometer mounted on the disk drive housing (base 9 in FIG. 1). In this example, as well as in the later examples of FIGS. 5 and 6, the bias current to the MR sensor 60 was constant at 11.25 milliamps. The calibration of the accelerometer is ½G per vertical division (1 G equals the acceleration of gravity or 9.8 m/sec$^2$). Thus the peak-to-peak shock is about 1 G. FIG. 4 shows that the BLM shock detector response is very sensitive to external shocks and continues to ring even after the accelerometer output has ceased. This shows a key advantage of the BLM shock detector, i.e., it continues to monitor head carrier movement even after a conventional accelerometer ceases to provide a response. This is important since it is actual movement of the write head that is desired to be monitored to prevent off-track writing.

Figure 5:
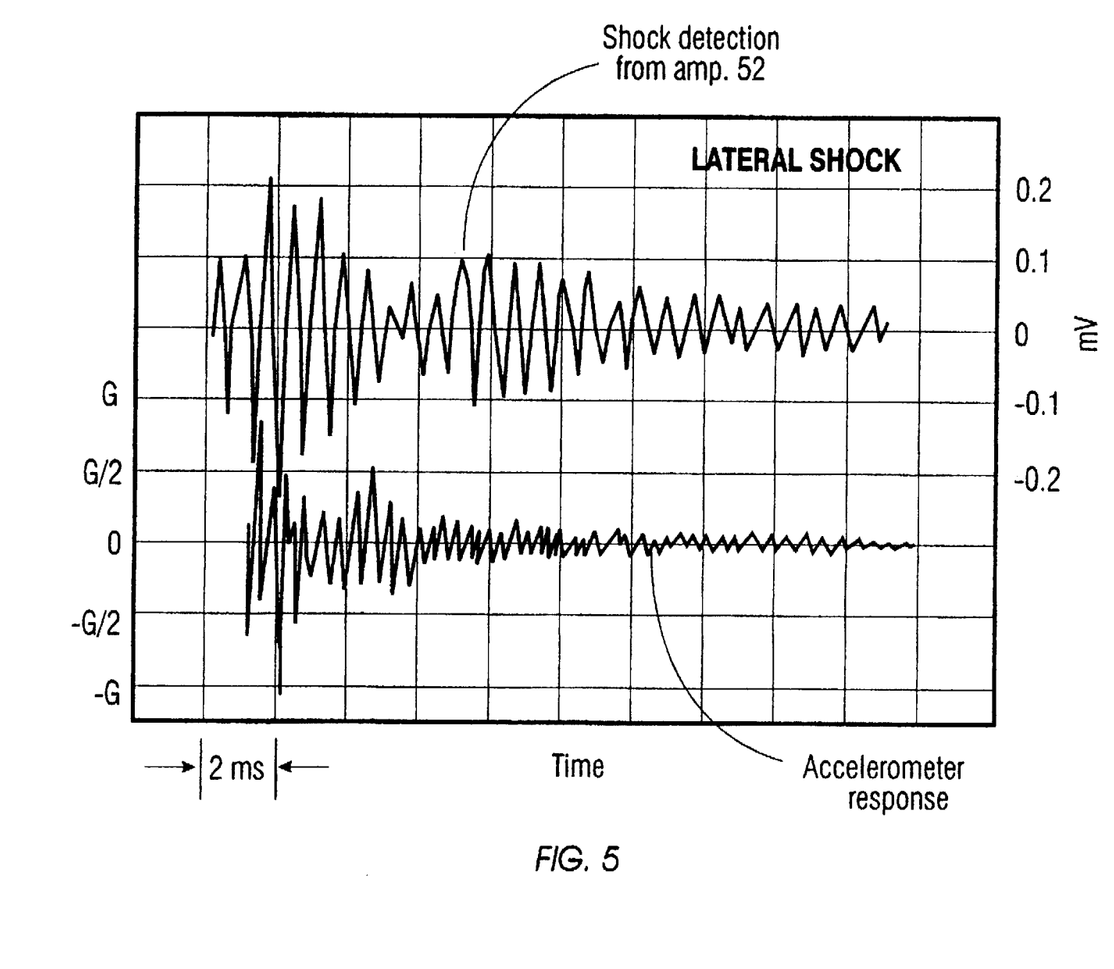
FIG. 5 is a graph of the baseline modulation shock detector response compared to accelerometer response for an external shock applied in a lateral direction in the plane of the disk.

FIG. 5 shows the response to a lateral shock in the plane of the disk 10. The peak-to-peak shock is approximately 1.75 G measured in the direction perpendicular to the disk. As for the case of a shock in the direction perpendicular to the disk 10, the head carrier continues to move long after the accelerometer indicates that the shock has decayed.

Figure 6:
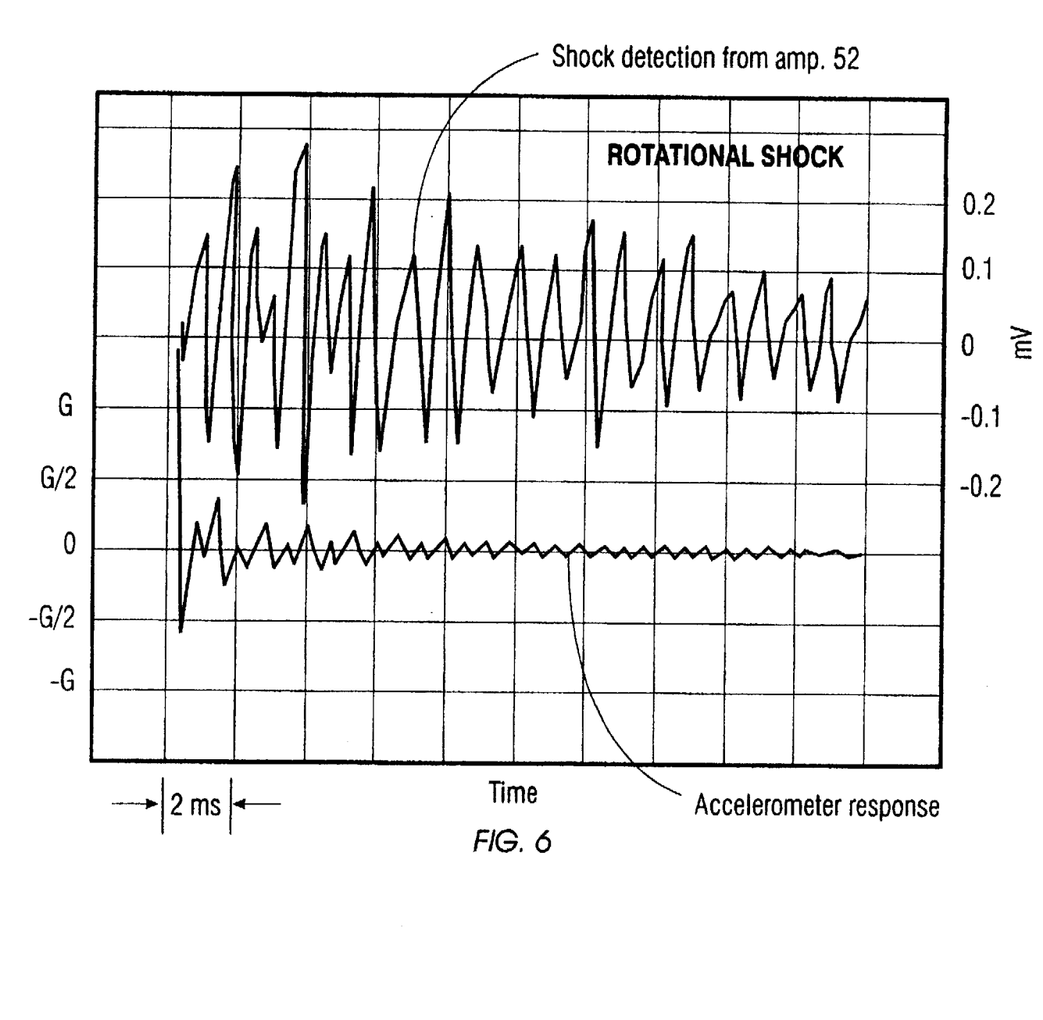
FIG. 6 is a graph of the baseline modulation shock detector response compared to accelerometer response for an external shock applied in a purely rotational direction in the plane of the disk.

FIG. 6 shows the response to a purely rotational shock. In this example, the disk drive was mounted in a rotary mount so it was free to rotate only in the plane of the disk 10. An external shock was then applied to the drive, resulting in the response shown in FIG. 6. The peak-to-peak shock was 2 G, measured in-plane, and the BLM shock detector response was a strong signal very similar to the responses for the perpendicular shock (FIG. 4) and the lateral shock (FIG. 5). Even though the shock is purely rotational it still results in a BLM shock detector response. Theoretically the BLM shock detector should not give an output if the rotational shock only induced side to side motion of the MR sensor because the signal moodulation is due only to the high frequency head-disk spacing fluctuations. However, FIG. 6 shows that a purely rotational shock couples quite well to up and down head-disk spacing changes of the MR sensor. This is due to the fact that a disk drive is a complicated mechanical structure in which external rotational shocks will excite vibration modes that couple the rotational energy into perpendicular motion of the head carrier.

The three responses of the baseline MR signal to various directional external shocks, as shown in FIGS. 4-6 by the signal output from amplifier 52 of BLM detection circuit 55, clearly establish that all types of external shocks will couple into head-disk spacing fluctuations. The BLM shock detector can be calibrated experimentally by use of accelerometer output, as shown by FIGS. 4-6. Thus from experimental data it is known what G level of shock will likely result in off-track writing for a particular disk drive. By use of FIGS. 4-6 the output of amplifier 52 (shown in units of 0.1 mV) that corresponds to this G level can be used to select the level of the threshold signal to be applied on line 56 to comparator 53. Alternatively, the threshold levels can be selected by direct calibration of the BLM shock detector from experiments where known external shocks are applied and the position error signal (PES) from the servo control system and the output of amplifier 52 are measured and compared. Also, as described previously, separate threshold values can be stored corresponding to each head carrier in the disk drive.

While the preferred embodiments of the present invention have been illustrated in detail, it should be apparent that modifications and improvements may be made to the invention without departing from the spirit and scope of the invention as described in the following claims.

What is claimed is:

1. A magnetic recording disk drive comprising:

a magnetic recording disk for storing magnetically recorded data;

a motor connected to the disk for rotating the disk;

a magnetoresistive sensor heated by an electrical bias current and maintained near one of the surfaces of the disk for generating a signal comprising a baseline voltage signal with analog positive and negative voltage pulses of a generally fixed amplitude about said baseline signal, said baseline signal representing a variation in electrical resistance of the sensor caused by a variation in temperature of the sensor associated with a change in spacing between the sensor and the disk, and said analog pulses representing data magnetically recorded on the disk;

data channel circuitry coupled to the sensor for processing the signal from the sensor into digital signals representing data magnetically recorded on the disk; and shock detection circuitry coupled to the sensor and comprising a filter for filtering said analog pulses from said baseline signal, an amplifier for amplifing the baseline signal from said filter, and a comparator for comparing the amplified baseline signal with a predetermined shock threshold value, the shock detection circuitry generating a shock signal representing an increase or decrease of the spacing between the sensor and the disk in response to an external shock to the disk drive.

2. The disk drive according to claim 1 further comprising a write head connected to the data channel for recording data on the disk and a controller coupled to the shock detection circuitry and the data channel, the controller generating a write inhibit signal to the data channel in response to receipt of a shock signal from the shock detection circuitry.

3. The disk drive according to claim 2 further comprising memory storage coupled to the controller for storing a value representative of the predetermined shock threshold.

4. The disk drive according to claim 3 wherein the disk drive includes at least two magnetoresistive sensors and wherein the memory storage stores two threshold values, each stored value being associated with one of the two sensors.

5. The disk drive according to claim 1 further comprising a first carrier for supporting the magnetoresistive sensor near one surface of the disk, a second carrier for supporting the write head near the other surface of the disk, and an actuator connected to the first and second carriers for moving the carriers across their respective disk surfaces.

6. A magnetic recording disk drive comprising:

a magnetic recording disk for storing magnetically recorded data;

a motor connected to the disk for rotating the disk;

a magnetoresistive sensor maintained near a surface of the disk, the sensor generating a signal comprising a baseline voltage level with analog positive and negative voltage pulses of a generally fixed amplitude about said baseline, said pulses representing the data magnetically recorded on the disk, said baseline voltage level varying in response to changes in spacing between the sensor and the disk;

a write head maintained near a surface of the disk for recording data on the disk;

read/write data channel circuitry coupled to the sensor for processing said analog pulses in the signal from the sensor into digital signals representing data magnetically recorded on the disk and to the write head for directing digital data to be recorded on the disk to the write head;

shock detection circuitry coupled to the sensor for detecting modulation of said signal baseline voltage caused by changes in spacing between the sensor and the disk due to an external shock to the disk drive, the shock detection circuitry generating a shock signal when the modulation of the baseline voltage exceeds a predetermined shock threshold; and a controller coupled to the shock detection circuitry and the read/write data channel, the controller generating a write inhibit signal to the data channel in response to receipt of a shock signal from the shock detection circuitry, whereby writing of data on the disk is prevented in the presence of external shocks to the disk drive.

7. The disk drive according to claim 6 further comprising memory storage coupled to the controller for storing a value representative of the predetermined shock threshold and wherein the controller provides a shock threshold control signal to the shock detection circuitry representative of said stored shock threshold value.

8. The disk drive according to claim 7 wherein the shock detection circuitry includes a comparator having a threshold control input for receipt of the shock threshold control signal from the controller, the comparator comparing positive and negative excursions of said baseline modulation signal with said shock threshold.

9. The disk drive according to claim 7 wherein the disk drive includes at least two magnetoresistive sensors and wherein the memory storage stores two threshold values, each stored value being associated with one of the two sensors.

10. The disk drive according to claim 6 wherein the shock detection circuitry includes a filter for filtering said analog pulses representing magnetically recorded data and an amplifier for amplifying the signal from said filter.

11. The disk drive according to claim 6 further comprising a first carrier for supporting the magnetoresistive sensor near one surface of the disk, a second carrier for supporting the write head near the other surface of the disk, and an actuator connected to the first and second carriers for moving the carriers across their respective disk surfaces.

* * * * *